(12) United States Patent
Whitlock

(10) Patent No.: US 10,272,874 B2
(45) Date of Patent: *Apr. 30, 2019

(54) VEHICLE ENGINE OPERATION

(71) Applicant: TRACKER NETWORK (UK) LIMITED, Middlesex (GB)

(72) Inventor: Roderick Whitlock, Midlothian (GB)

(73) Assignee: TRACKER NETWORK (UK) LIMITED, Uxbridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/476,438

(22) Filed: Mar. 31, 2017

(65) Prior Publication Data

US 2017/0203719 A1    Jul. 20, 2017

Related U.S. Application Data

(63) Continuation of application No. 12/989,654, filed as application No. PCT/EP2009/055311 on Apr. 30, 2009, now Pat. No. 9,643,570.

(30) Foreign Application Priority Data

Apr. 30, 2008 (GB) .................................. 0807837.0

(51) Int. Cl.
    *B60R 25/10*    (2013.01)
    *F02D 41/00*    (2006.01)
    (Continued)

(52) U.S. Cl.
    CPC ........ *B60R 25/1003* (2013.01); *B60R 25/102* (2013.01); *B60R 25/1004* (2013.01); *B60R 25/1018* (2013.01); *F02D 41/00* (2013.01); *F02N 11/0848* (2013.01); *G07C 5/0816* (2013.01); *G07C 5/0841* (2013.01);
    (Continued)

(58) Field of Classification Search
    None
    See application file for complete search history.

(56) References Cited

U.S. PATENT DOCUMENTS 4,580,125 A    4/1986    Gotanda
4,742,310 A    5/1988    Kato
(Continued)

FOREIGN PATENT DOCUMENTS

| EP | 0384436 A2 | 8/1990 |
| EP | 1978490 A1 | 10/2008 |
| GB | 2148034 A | 5/1985 |

*Primary Examiner* — Nay Tun
*Assistant Examiner* — Shawna M Kingston
(74) *Attorney, Agent, or Firm* — EIP US LLP

(57) ABSTRACT

Disclosed is a system for detecting an operating state of a vehicle engine. The system comprises: an input coupled to a power line of a vehicle; means to filter out relatively high frequency transient noise components of a signal received from the power line; a first detector for receiving the filtered signal and detecting when transient noise associated with the power line rises above a first threshold and generating a first detection signal in response thereto; a second detector for receiving the filtered signal and detecting when the transient noise falls below a second threshold, which is lower than the first threshold, and generating a second detection signal in response thereto; and means for generating a first output signal in response to the first detection signal and a second output signal in response to the second detection signal.

19 Claims, 6 Drawing Sheets

(51) Int. Cl.
  *F02N 11/08* (2006.01)
  *G07C 5/08* (2006.01)
  *B60R 25/102* (2013.01)
  *H04L 12/40* (2006.01)
  *F02D 41/04* (2006.01)
  *F02D 41/06* (2006.01)
  *F02D 41/14* (2006.01)

(52) U.S. Cl.
  CPC ...... *H04L 12/40039* (2013.01); *F02D 41/042* (2013.01); *F02D 41/062* (2013.01); *F02D 2041/1432* (2013.01); *F02N 2200/063* (2013.01); *H04L 2012/40215* (2013.01); *H04L 2012/40273* (2013.01)

(56) References Cited

U.S. PATENT DOCUMENTS

| | | |
|---|---|---|
| 5,004,979 A | 4/1991 | Marino et al. |
| 5,079,496 A | 1/1992 | Pierret et al. |
| 5,128,650 A | 7/1992 | Peters et al. |
| 5,381,295 A | 1/1995 | Rund et al. |
| 5,397,925 A | 3/1995 | Carlo et al. |
| 5,450,321 A | 9/1995 | Crane |
| 5,535,722 A | 7/1996 | Graessley et al. |
| 5,743,227 A | 4/1998 | Jacquet et al. |
| 5,903,063 A | 5/1999 | Blaker |
| 6,014,447 A | 1/2000 | Kohnen et al. |
| 6,400,125 B1 | 6/2002 | Pierret et al. |
| 6,566,845 B2 | 3/2003 | Tanlguchi et al. |
| 6,549,014 B1 | 4/2003 | Kutkut et al. |
| 7,021,128 B2 | 4/2006 | Rauchfuss et al. |
| 8,164,484 B2 | 4/2012 | Berger et al. |
| 2001/0054890 A1 | 12/2001 | Thibedeau et al. |
| 2002/0068999 A1 | 6/2002 | Kotre et al. |
| 2002/0190873 A1 | 12/2002 | Flick |
| 2003/0093192 A1 | 5/2003 | Chang |
| 2004/0075539 A1 | 4/2004 | Savole et al. |
| 2006/0253282 A1 | 11/2006 | Schmidt et al. |
| 2007/0006105 A1 | 1/2007 | Bartling et al. |
| 2007/0241723 A1 | 10/2007 | Billat |
| 2011/0084807 A1 | 4/2011 | Logan et al. |

# VEHICLE ENGINE OPERATION

CROSS-REFERENCE TO RELATED APPLICATIONS

This application is a continuation of U.S. application Ser. No. 12/989,564, filed May 17, 2011, which is a national stage filing under 35 U.S.C. § 371(c) of International Application No. PCT/EP2009/055311, filed Apr. 30, 2009, which claims the benefit of GB Application No. 0807837.0, filed Apr. 30, 2008. Each of the above-referenced patent applications is incorporated by reference in its entirety.

BACKGROUND OF THE INVENTION

Field of the Invention

The present invention relates to detecting an operating state of a vehicle engine, in particular, but not exclusively, for use with vehicle security systems.

Description of the Related Technology

It is important for various reasons to be able to detect an operating state of a vehicle. For example, detecting whether a vehicle is being driven legitimately is important for vehicle security systems. In this case, for example, detecting that a vehicle is moving if the engine is not running could mean that the vehicle is being stolen by being towed or carried away, and then it would be important for the security system to raise an alarm.

However, reliably detecting an operating state of a vehicle engine is not a trivial task, as vehicles nowadays have many different electrical systems, at least some of which may operate even after an engine is switched off. While it is essential to detect that a vehicle is being stolen, for example, it would be highly undesirable to raise false alarms.

SUMMARY

In accordance with one aspect of the present invention, there is provided a system for detecting an operating state of a vehicle engine, the system comprising: an input for coupling in a signal from a power line of a vehicle; means to filter out relatively high frequency transient noise components of a signal received from the power line; a first detector for receiving the filtered signal and detecting when transient noise associated with the power line rises above a first threshold and generating a first detection signal in response thereto; a second detector for receiving the filtered signal and detecting when the transient noise falls below a second threshold, which is lower than the first threshold, and generating a second detection signal in response thereto; and means for generating a first output signal in response to the first detection signal and a second output signal in response to the second detection signal.

According to another aspect, the present invention provides a security system utilizing the system of the first aspect.

It has been appreciated that electrical noise can be monitored and used to determine whether a vehicle is being stolen. For example, systems may be arranged to detect, on a vehicle's electrical cabling, electrical noise produced by an operational alternator. This can provide a method by which it is possible to determine whether an engine is running and, hence, used to provide an arm/disarm signal for a vehicle movement detector.

However, the reliable detection of alternator noise can be complicated by additional noise induced into the cabling from other sources. Such sources may include radio sources, producing radio frequency (RF) noise, and controller area network (CAN) busses. CAN busses are found in many modern vehicles and carry data signals between the various electronic components such as on-board processors and vehicle management and monitoring systems.

The difference between noise from an operational alternator and noise from, for example, RF transmitters and CAN buses has been found to be relatively small, and, as such, relying on monitoring alternator noise alone to arm and disarm a security system has been found to be unreliable.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
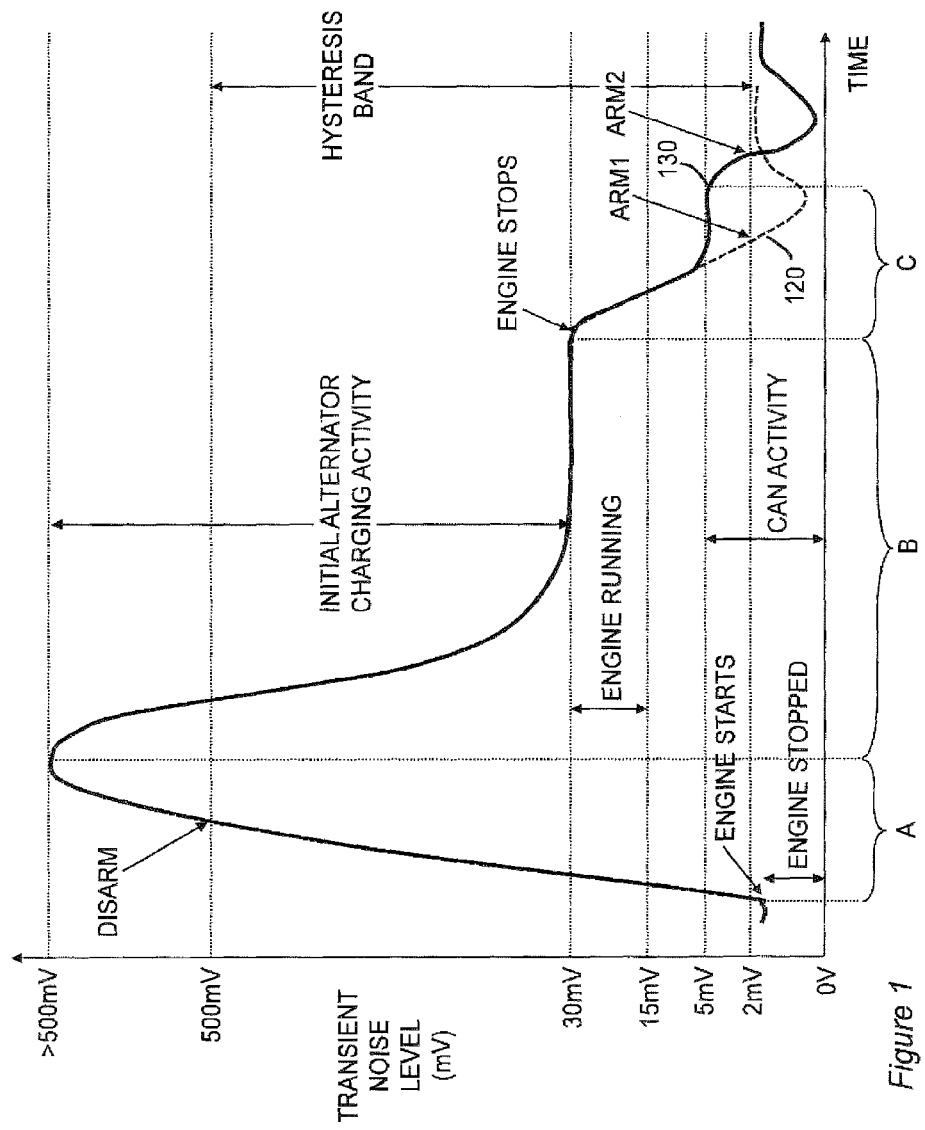
FIG. 1 is a graph which illustrates a noise characteristic for a vehicle before during and after engine operation.

Before describing an embodiment of the invention in greater detail, we will first describe the general characteristics of the transient noise that can be detected on a power line of a vehicle, such as a car or lorry, with reference to the transient noise graph in FIG. 1.

The vertical axis of the graph in FIG. 1 represents transient noise level measured in mV and the horizontal axis represents time. Neither the vertical axis nor the horizontal axis is to scale.

The solid curve in the graph in FIG. 1 represents how the transient noise on the power line of a vehicle changes over time before, during and after typical internal combustion engine operation.

Before the engine of the vehicle starts (that is, before time period A), the transient noise level is typically around 2 mV. This noise may results from electrical circuits that remain active while the vehicle is not in use, such as clock and car alarm circuits, and can also be induced by external electrical and RF sources.

At the beginning of the time period A, the vehicle ignition is operated in order to start the engine. This typically involves energizing an electric starter motor to start the engine until it fires and then continues unassisted operation. Starter motors are typically low voltage, high current devices that, when in use, draw extremely large currents from a vehicle battery. As soon as the engine is running, it typically drives an alternator, which is responsible for re-charging the battery. For a few seconds after the starter motor has been operated, the alternator operates to generate significant charge to recharge the battery, as a consequence of the high current that has been drawn from it by the starter motor. During this time, the alternator generates significant transient noise, typically in excess of 500 mV according to the present example, as illustrated in time period A in the graph. The frequency of the noise from the alternator is governed by factors such as the number of poles in the alternator, the engine speed (in revolutions per second) and the gearing between engine revolutions and alternator revolutions. However, it is expected that alternator frequencies would typically not rise above about 1 KHz.

After the alternator has substantially recharged the battery (at the end of period A), the alternator decreases its charging activity and the associated transient noise level drops significantly to a level that is associated with normal engine operation (latter half of time period B), which is around 15-40 mV. This level of transient noise persists while the vehicle engine is in operation, though there may be noise spikes on occasion if the alternator is required to compensate for high energy use that would otherwise drain the battery. Such high energy use may be associated with the use of lots of electrical devices, such as lights, air conditioning, windshield wipers etc. during poor weather conditions.

When a vehicle engine is switched off (end of time period B), much of the transient noise associated with the engine operation also ceases. However, in many modern cars, the noise level does not drop immediately to the initial 'engine stopped' noise levels. For example, an electric cooling fan may continue to operate after the engine is switched off. Also, noise continues to be generated by the CAN (time period C), which can cause noise levels to remain, for example, at around 5 mV and continue at this level for several minutes, due, for example, to CAN-controlled courtesy lights operating after the engine has been switched off.

Only when the CAN noise subsides does the overall transient noise level drop back to the engine stopped noise levels of around 2 mV (after time C).

The graph in FIG. 1 illustrates transient noise that results from vehicle devices and systems. Another kind of noise, which can be induced onto and detected on vehicle power lines, is radio frequency noise produced by high power RF transmitters and especially nearby radio masts. Television transmitters, in particular, can have radiated powers of the order of 20 kW. Lower frequencies of RF noise induced by radio masts can be significant, for example exceeding a volt.

It will be appreciated that the graph in FIG. 1 is exemplary and that the curve might vary in level and form from one vehicle to another. However, the key features of high noise due to alternator activity after engine start and low noise a period of time after the vehicle has stopped are generally the same for all combustion engine driven vehicles.

An embodiment of the present invention will now be described with reference to the functional block diagram in FIG. 2. The diagram illustrates a transient voltage detector circuit 200 according to embodiments of the present invention.

Figure 2:
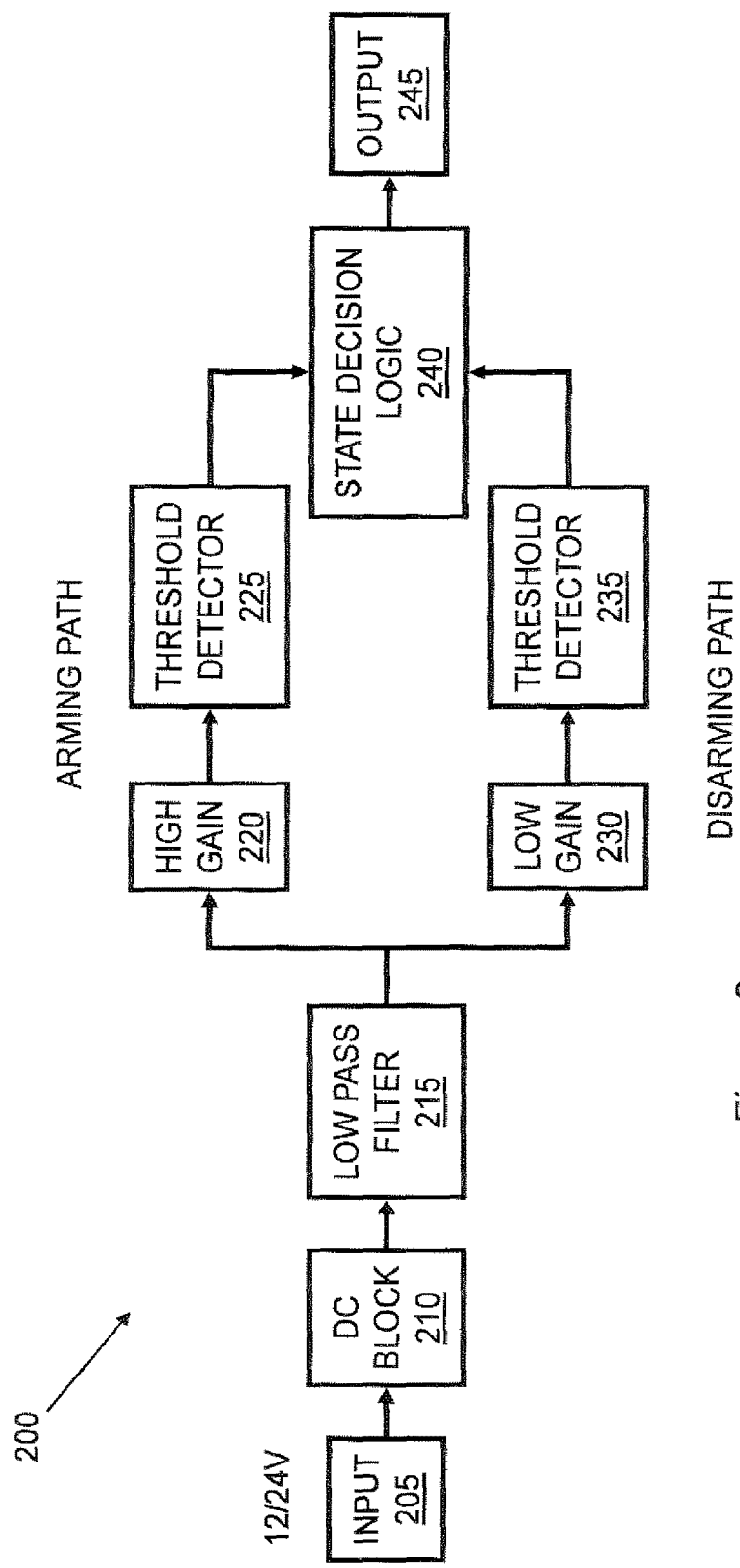
FIG. 2 is a high level block diagram of a circuit according to an embodiment of the present invention.

The circuit in FIG. 2 comprises an input 205, which is typically coupled by way of a physical connection to the positive power feed of a vehicle electrical system, whereby the input signal of the circuit can be tapped from the power feed. For cars, the voltage may be around 12 V DC and for lorries it may be 24 V DC. Next, the circuit includes a DC blocking element 210 for filtering out DC, thereby permitting only transient voltage signals to pass. Next, there is a low pass filter 215 for blocking or rejecting any CAN and RF frequencies that have been induced onto the power lines. The low pass filter 215 is arranged to cut-off above about 1 KHz, which is intended to permit alternator noise to pass. However, it is expected that a higher-frequency cut-off of 1.5 KHz or even up to 2.5 KHz would still provide satisfactory operation. The dashed portion 120 of the curve of FIG. 1 shows the filtered transient noise level at the output of the low pass filter 215; whereas the solid portion 130 of the curve illustrates the unfiltered transient noise level of the power line. The resulting DC blocked and filtered signal is input to downstream parts of the circuit. The circuit then splits into two circuit paths, which will, for convenience, be denoted the 'upper' (or arming), path and the 'lower' (or disarming) path. The arming path includes a high gain element 220 and a threshold detector 225 and the disarming path includes a low gain element 230 (or no gain element) and a threshold detector 235. Outputs from each of the threshold detectors pass into a state decision logic element 240, which uses the inputs to generate an output 245, which can be used in subsequent stages (not shown in FIG. 2) for example, for arming and disarming vehicle theft system stages.

According to embodiments of the present invention, the high gain arming path in FIG. 2 is for detecting when the remaining, relatively low frequency transient noise voltage drops below voltages that are normally associated with CAN activity (when unfiltered). Detecting when the transient noise voltage drops to this level can be used to arm a security system, as illustrated by the "ARM1" point in the graph in FIG. 1. It will be appreciated that, without such filtering of the CAN noise, arming could occur, as illustrated by the ARM2 point in the graph in FIG. 1, a significant time after the engine has stopped. The low gain disarming path is for detecting when the remaining, relatively low frequency transient noise voltage rises above voltages that are normally associated with starter motor activity, or more accurately, with alternator activity after starter motor operation.

Figure 3A:
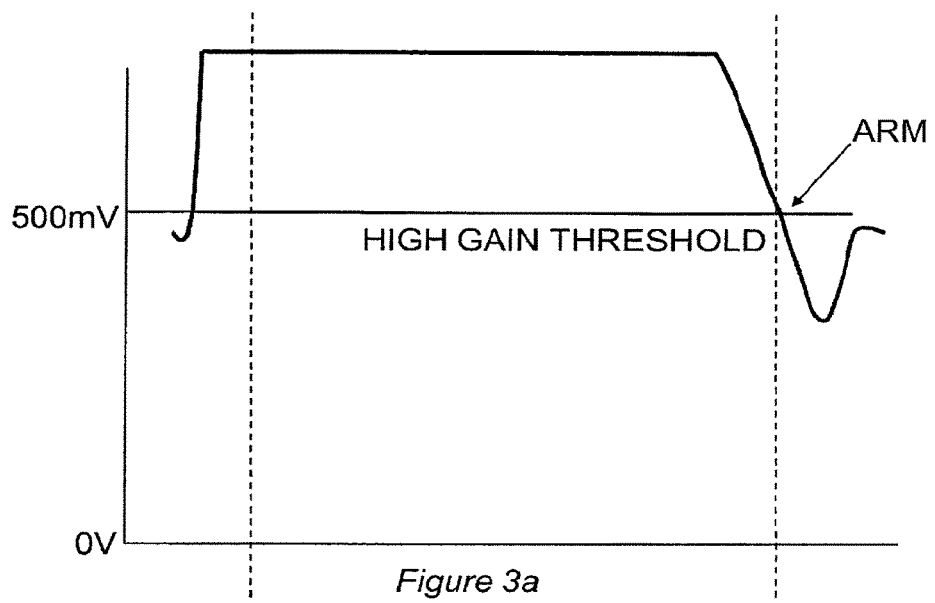
FIGS. 3a and 3b are graphs showing how elements of the circuit of FIG. 2 condition noise signals.
Figure 3B:
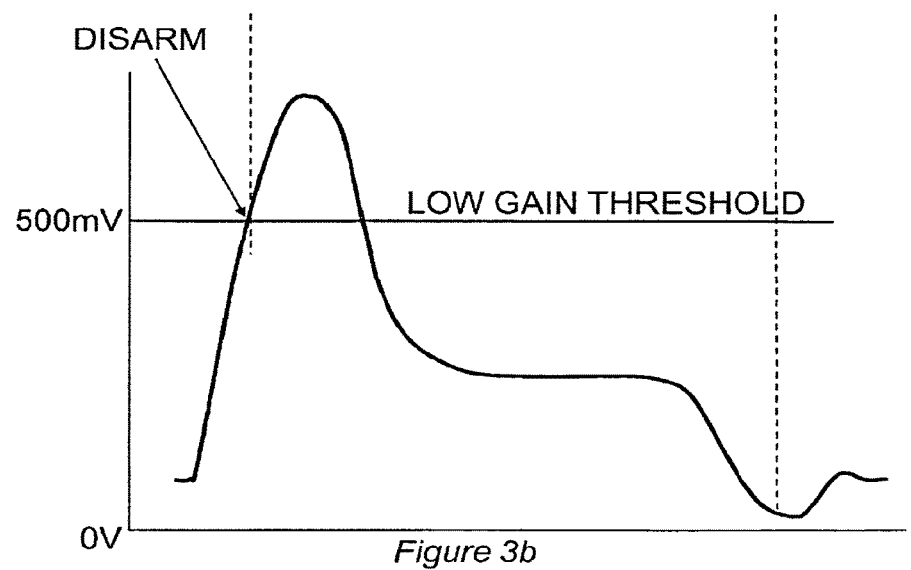

The graphs in FIGS. 3a and 3b, illustrate the signals after being conditioned by high and low gain elements, respectively, and before being input into the respective threshold detectors. The upper graph in FIG. 3a illustrates how the low noise voltage signal is amplified in order to increase the arming signal voltage to around 500 mV. The graph also illustrates that the higher voltage noise signals are typically clipped, due to amplifier saturation. The lower graph in FIG. 3b illustrates how the high voltage noise signal associated with the alternator operation has not been significantly amplified or conditioned, such that the disarming voltage level remains at around 500 mV. In this way, circuit components, and in particular threshold detectors, can conveniently be designed to operate within the same voltage ranges for both upper and lower arms. The signals in the lower path have not been clipped and the curve of the graph is substantially the same as that shown in FIG. 1.

It will be appreciated that the upper and lower paths and respective components do not need to be designed so that the arming and disarming signals are conditioned to be in the same voltage ranges. Threshold detectors can be designed to operate over different input voltage ranges. However, it is convenient to condition the signals so that similar threshold detectors can be used. In addition, in a practical circuit, it may be desirable for the gain and threshold levels in the paths to be variable, so that the circuits can be tuned to operate with different vehicles, which may subject the circuits to different levels of noise voltage.

The graphs in FIG. 4 exemplify how the inputs to the state decision logic block (that is, the outputs from the threshold detectors) and the output from the state decision logic block vary as the noise voltage levels vary. The graph in FIG. 4a is generally the same as the graph in FIG. 1, and acts merely as a timing reference for the other graphs, to identify the arming and disarming points of the noise voltage curve.

Figure 4A:
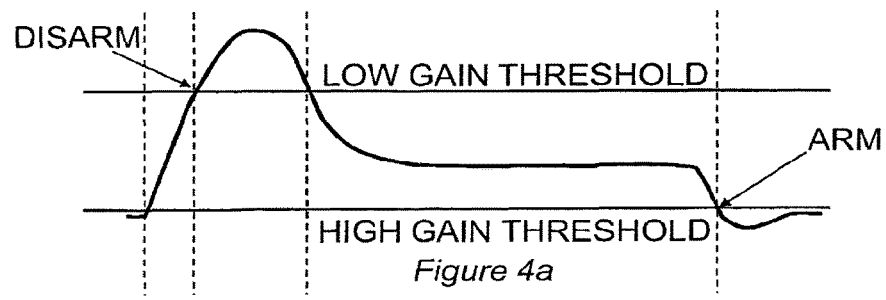
FIG. 4a reproduces FIG. 1 by way of comparison to FIGS. 4b-4d, which represent signal states at various points in the circuit of FIG. 2.
Figure 4B:
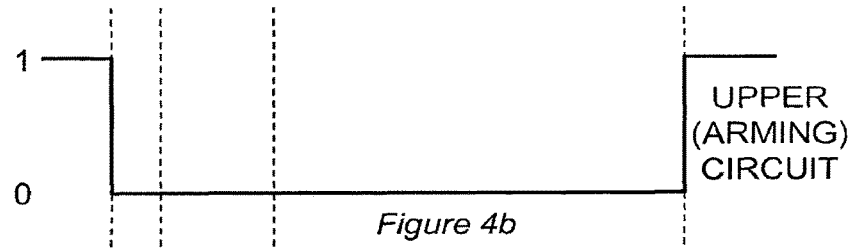

As shown in FIG. 4b, the output from the upper threshold detector, which acts as the arming circuit, is arranged to move from a high voltage state to a low voltage state when the noise voltage increases above the arming signal threshold, and then from the low voltage state to the high voltage state when the noise voltage drops below the arming signal voltage.

Figure 4C:
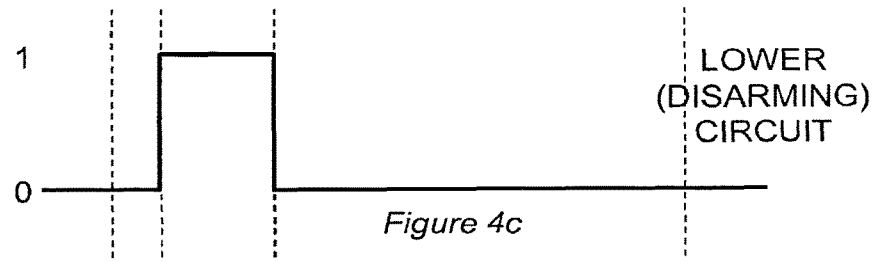

In contrast, as shown in FIG. 4c, the lower threshold detector, which acts as the disarming circuit, is arranged to move from a low voltage state to a high voltage state when the noise voltage level rises above the disarming voltage threshold, and then from the high voltage state to the low voltage state when the noise voltage drops below the disarming voltage signal level.

Figure 4D:

Finally, the output of the state logic block, resulting from receiving the threshold detector inputs, is shown in FIG. 4d. The state decision block produces a high voltage 'armed' output until the disarming voltage in FIG. 4c goes high. Thereafter, the state decision logic block maintains the low voltage 'disarmed' output until the arming voltage of FIG. 4b goes high.

Figure 5:
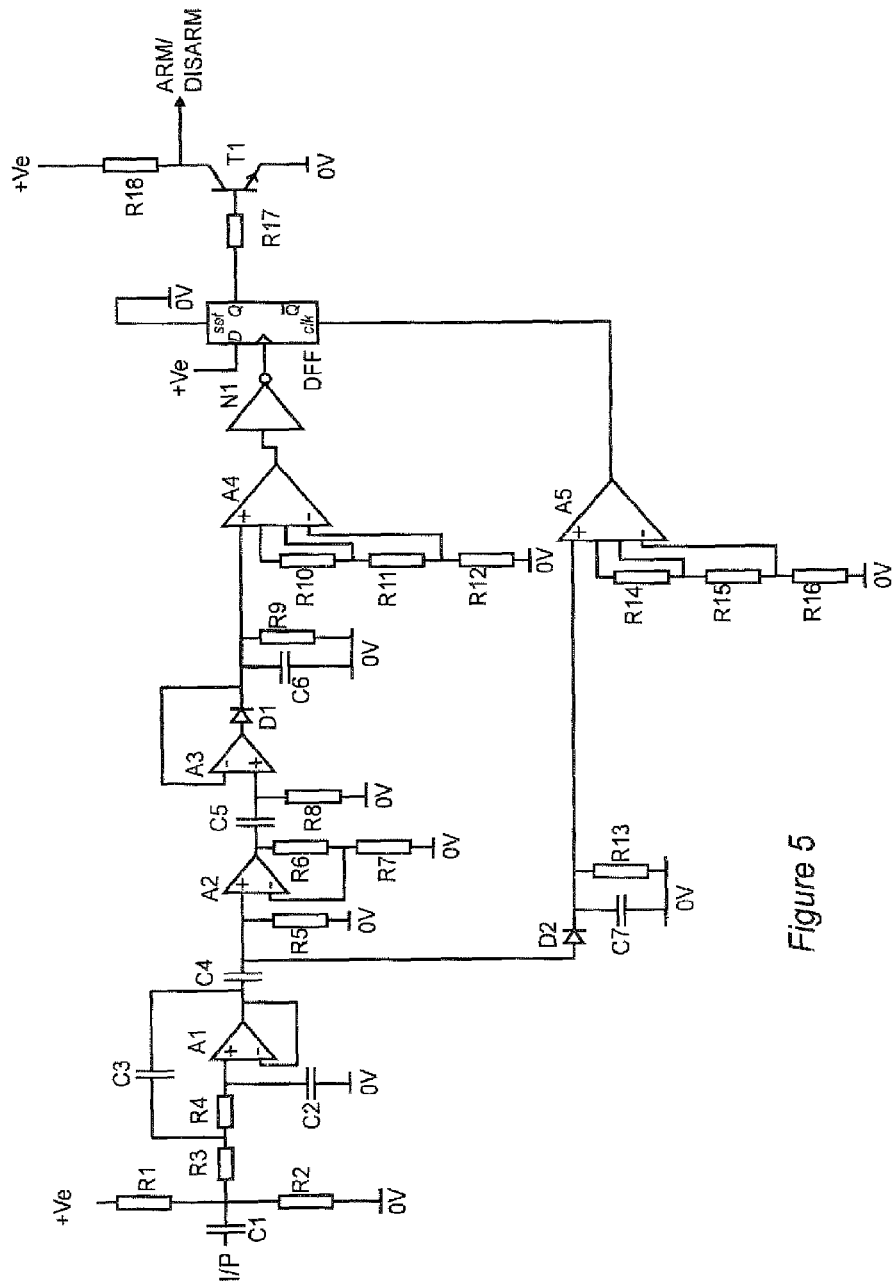
FIG. 5 is a detailed circuit diagram illustrating exemplary components for the circuit of FIG. 2.

Exemplary circuit components for the blocks of FIG. 2 are shown in the circuit diagram of FIG. 5.

In FIG. 5, an input I/P is tapped from the raw vehicle positive power rail, which, for this example is a 12V motor car positive line. The circuit is powered by a regulated positive power supply +Ve, which in this example is 9V. The input voltage from the vehicle supply is DC-blocked using an input capacitor (C1), the output of which is DC biased by a voltage divider (R1, R2) and fed into a low-pass filter section (R3, R4, A1, C2, C3). The output of the low pass filter section is again DC blocked by a capacitor (C4), the output of which is split into two arms of the circuit: an upper high gain arm and a lower low gain arm.

Considering the upper high gain arm first, the DC-blocked and low pass filtered signal feeds a high gain noise detection circuit, of which components R5, A2, R6, R7, C5, R8 are a gain element and A3, D1, C6 and R9 are a precision peak detector. The high gain noise detection circuit is arranged to amplify the input signal by a factor of 50, so that noise signals of around 2 mV are amplified to around 100 mV. The output of the high gain noise detection circuit is fed into a first threshold detector arrangement (A4, R10, R11, R12), which is arranged to switch from a low output (0V) voltage to a high output voltage when the input voltage exceeds 100 mV. The threshold detector circuit includes an inverter (N1), for inverting the output of the threshold detector for subsequent input to the state decision logic block.

The state decision logic block comprises a D-type flip-flop arrangement, of which the D-input is tied to the positive power supply +Ve and the clock input is fed by the inverted output of the first threshold detector. The effect of this is that the Q-output of the flip-flop, under normal circumstances, goes high on the positive-going edge of the clock pulse and remains high until reset.

Considering the lower low gain arm, the DC-blocked and low pass filtered signal feeds a peak detector (D2, C7, R13). The output of the low gain noise detection circuit is fed into a second threshold detector arrangement (A4, R14, R15, R16), which, in this example, is exactly the same as the first threshold detector arrangement (but with no inverter). The output of the second threshold detector circuit is arranged to switch from low output (0V) to high output (+Ve) when the input voltage exceeds 100 mV. The output is applied to the reset port of the D-type flip flop, so that, when the signal goes high, the Q-output is reset to a 'disarmed' low state. The output remains low until the clock input, fed by upper arm, goes high once more.

Exemplary values for the components in FIG. 5 are provided in Table 1 at the end of this description.

The overall effect of the circuit in FIG. 5 is that when the noise level on the power line drops below a first threshold (2 mV in the example in FIG. 1), the circuit generates an ARM signal, and when the noise level jumps higher than a second threshold (500 mV in the example in FIG. 1), the circuit generates a DISARM signal, wherein the first threshold is far lower than the second threshold. The voltage drop across D1 (where D1 and D2 are Schottky Diodes) is about 400 mV, which explains how the threshold of the second threshold detector can be 100 mV when the actual disarm signal voltage is 500 mV.

As shown in the exemplary graph in FIG. 1, the circuit, in effect, provides a hysteresis band between 2 mV and 500 mV, over which disarming occurs at a significantly higher noise voltage level than arming; and no arming or disarming occurs within upper and lower limits of the hysteresis band. In this example, the hysteresis band is nearly 500 mV wide and the ratio of disarming voltage to arming voltage is 250:1. Wider bands and/or higher ratios could be advantageous in some embodiments; for example, ratios could exceed 300:1, 400:1, 500:1 or more. Equally, narrow bands and/or lower ratios could be advantageous in other embodiments; for example, 200:1, 100:1, 50:1 or less. The upper and lower limits are set according to a particular vehicle's characteristics, although an arrangement suitable for a wide range of vehicles has obvious commercial advantages. In some embodiments, the disarming voltage could be of the order of 100 mV, which is still sufficiently high according to the graph in FIG. 1 to provide a reliable disarming signal level. In other embodiments, the disarming voltage could be as high as 750 mV or even a volt. However, it is important to set the levels so that, for example, an alarm is armed and disarmed at appropriate times.

It will be appreciated that the operation of the circuit in FIG. 5 may be reproduced using other arrangements including microprocessor arrangements. For example, it is possible that the operation of the low gain block, threshold detectors and state decision logic could be replaced by an appropriately programmed microprocessor or hardware such as a microcontroller or ASIC. Other arrangements are conceivable and would be apparent to the skilled person on the basis of the present description.

Figure 6:
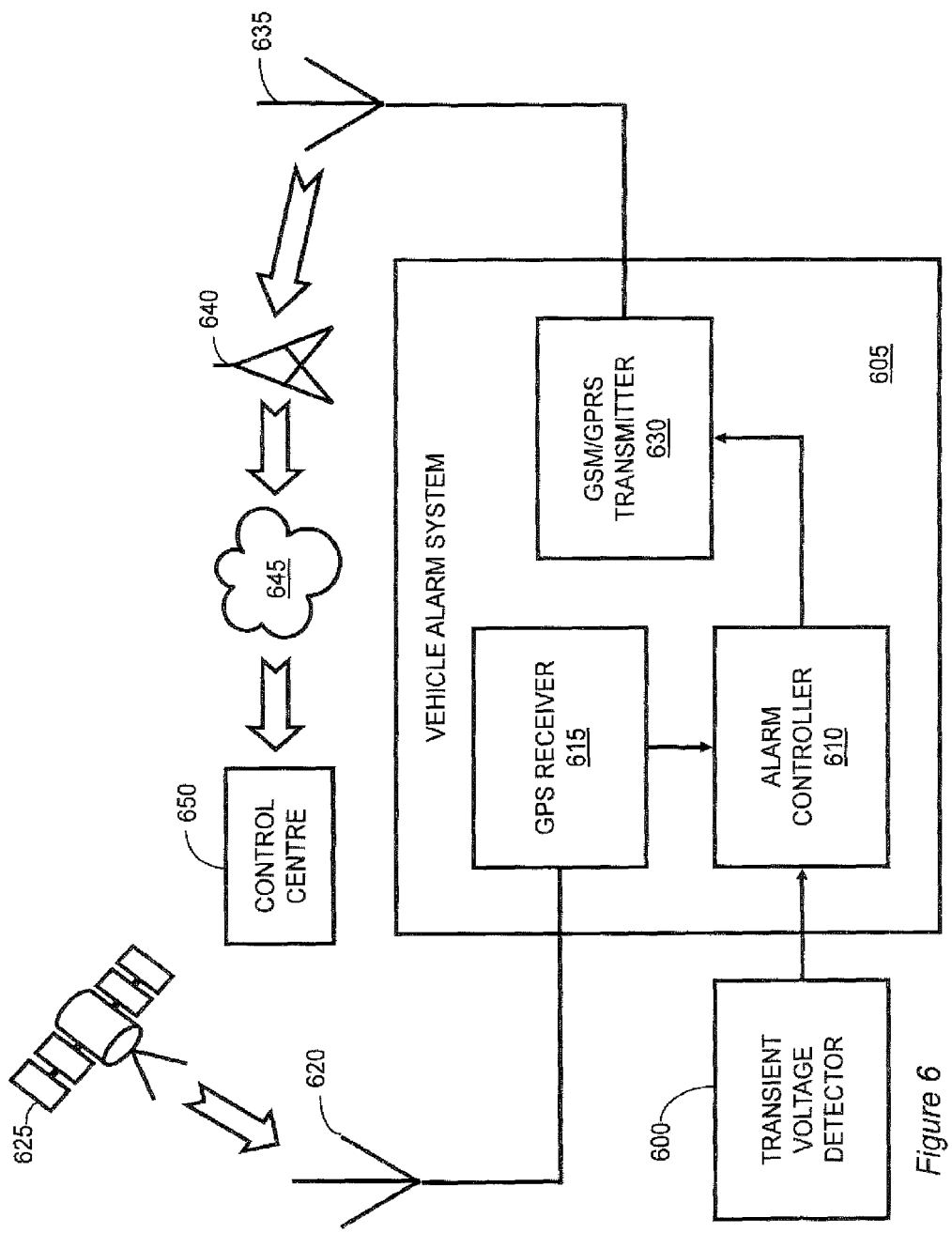
FIG. 6 is a block diagram of a vehicle alarm system including a circuit according to FIG. 2 acting as an arm/disarm element.

The diagram in FIG. 6 illustrates a transient voltage detector in a system according to embodiments of the present invention.

The transient voltage detector 600 operates as an arming circuit for an alarm system 605, which is installed in a vehicle (not shown). The alarm system 605 comprises an alarm controller 610, which controls the operation of the alarm system 605. The alarm controller 610 has an input from the transient voltage detector 600 and an input from a GPS receiver 615, which is connected to a first aerial 620 for receiving GPS signals from a GPS satellite 625. In this way, the alarm system 605 can detect the location of the vehicle. The controller 610 is also connected to a GPRS transmitter 630, which is connected to a second aerial 635, for communicating with a mobile phone mast 640. The mast 640 receives GPRS signals and forwards them, for example via an IP network 645, such as the Internet, to an alarm control center 650. The alarm control center receives signals from vehicle mounted alarm systems and can alert a vehicle's owner, and/or the police, if an alarm system indicates that a vehicle is being stolen.

As has already been described, the transient voltage detector 600 is arranged to arm the alarm system 605 when the noise voltage on the power line of the vehicle drops to a relatively low level, indicative of the vehicle being switched off, and disarm the alarm system 605 when the noise voltage on the power line rises above a relatively much higher level, indicative of the initial operation of an alternator, during and after operation of a starter motor.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

TABLE 1 component values for FIG. 5

| Component | Value | Component | Value |
|---|---|---|---|
| R1 | 1M | C1 | 10 μF |
| R2 | 1M | C2 | 6.8 nF |
| R3 | 15K | C3 | 10 nF |
| R4 | 15K | C4 | 0.1 μF |
| R5 | 1M | C5 | 0.1 μF |
| R6 | 47K | C6 | 10 μF |
| R7 | 1K | C7 | 0.1 μF |
| R8 | 1M | D1 | BAS81 |
| R9 | 470K | D2 | BAS81 |
| R10 | 100K | A1 | LMC6042 |
| R11 | 2.4M | A2 | LMC6042 |
| R12 | 390K | A3 | LMC6042 |
| R13 | 1M | A4 | MAX931 |
| R14 | 100K | A5 | MAX931 |
| R15 | 2.4M | N1 | 4069 |
| R16 | 390K | DFF | 14013 |
| R17 | 100K | T1 | ZTX605 |
| R18 | 10K | | |

What is claimed is:

1. A system for detecting an operating state of a vehicle engine, the system comprising:
   an input configured to couple in a signal from a power line of a vehicle engine;
   a low-pass filter configured to output a filtered signal by filtering the signal received from the power line to remove transient noise components of the signal which exceed a cut-off frequency, the cut-off frequency being selected to remove transient noise components induced on the power line by signalling activity on a control area network of the vehicle;
   a first detector configured to receive the filtered signal and detect when transient noise in the filtered signal rises above a first voltage threshold which indicates operation of a high current electrical ignition system for starting the vehicle engine, and generate a first detection signal in response thereto;
   a second detector configured to receive the filtered signal and detect when transient noise in the filtered signal falls below a second voltage threshold, which is lower than the first voltage threshold, and indicates that the vehicle engine has been switched off, and generate a second detection signal in response thereto; and
   a circuit configured to generate a first output signal in response to the first detection signal and a second output signal in response to the second detection signal.

2. The system of claim 1, wherein the first voltage threshold is set at a level that is higher than a level of transient noise associated with signalling activity on a controller area network of the vehicle when the engine is running.

3. The system of claim 1, wherein the second voltage threshold is set at a level that is lower than a level of transient noise associated with signalling activity on a controller area network when the vehicle engine is switched off.

4. The system of claim 1, wherein the input rejects any DC component of the signal received from the power line.

5. The system of claim 1, wherein the input rejects noise frequencies that exceed frequencies associated with alternator operation.

6. The system of claim 1, wherein the cut-off frequency of the low-pass filter exceeds 1 kHz.

7. The system of claim 1, wherein the first voltage threshold is higher than the second voltage threshold and wherein the first detector comprises a low-gain signal path and the second detector comprises a high-gain signal path.

8. The system of claim 7, wherein the first and second paths include threshold detectors, which operate over the same signal range of operation.

9. A security system for a vehicle comprising:
   an input configured to couple in a signal from a power line of a vehicle;
   a low-pass filter configured to output a filtered signal by filtering the signal received from the power line to remove transient noise components of the signal which exceed a cut-off frequency, cut-off frequency being selected to remove transient noise components induced on the power line by signalling activity on a control area network of the vehicle;
   a first detector configured to receive the filtered signal and detect when transient noise in the filtered signal rises above a first voltage threshold which indicates operation of a high current electrical ignition system for starting the vehicle engine, and generate a first detection signal in response thereto;
   a second detector configured to receiving the filtered signal and detect when transient noise in the filtered signal falls below a second voltage threshold, which is lower than the first voltage threshold, and indicates that the vehicle engine has been switched off, and generate a second detection signal in response thereto; and
   a circuit configured to generate a first output signal in response to the first detection signal and a second output signal in response to the second detection signal;
   wherein the security system is configured to arm in response to the second output signal and to disarm in response to the first output signal.

10. The security system of claim 9, comprising a movement detector, which is arranged to trigger an alarm signal if a respective vehicle is moved while the system is armed.

11. The security system of claim 10, wherein the alarm signal is communicated to a detector, which is remote from the vehicle.

12. A non-transitory computer-readable storage medium comprising computer-executable instructions which, when executed by a processor, cause a computing device to:

output a filtered signal by filtering a signal received from a power line of a vehicle to remove transient noise components of the signal which exceed a cut-off frequency, cut-off frequency being selected to remove transient noise components induced on the power line by signalling activity on a control area network of the vehicle;

detect when transient noise in the filtered signal rises above a first voltage threshold which indicates operation of a high current electrical ignition system for starting the vehicle engine, and generate a first detection signal in response thereto;

detect when transient noise in the filtered signal falls below a second voltage threshold, which is lower than the first voltage threshold, and indicates that the vehicle engine has been switched off, and generate a second detection signal in response thereto; and generate a first output signal in response to the first detection signal and a second output signal in response to the second detection signal.

13. The non-transitory computer-readable storage medium of claim 12, wherein the first voltage threshold is set at a level that is higher than a level of transient noise associated with signalling activity on a controller area network of the vehicle when the engine is running.

14. The non-transitory computer-readable storage medium of claim 12, wherein the second voltage threshold is set at a level that is lower the level of transient noise associated with signalling activity on a controller area network when the vehicle engine is switched off.

15. The non-transitory computer-readable storage medium of claim 12, wherein the input rejects any DC component of the signal received from the power line.

16. The non-transitory computer-readable storage medium of claim 12, wherein the input rejects noise frequencies that exceed frequencies associated with alternator operation.

17. The non-transitory computer-readable storage medium of claim 12, wherein the cut-off frequency of the low-pass filter exceeds 1 kHz.

18. The non-transitory computer-readable storage medium of claim 12, wherein the first detector comprises a low-gain signal path and the second detector comprises a high-gain signal path.

19. The non-transitory computer-readable storage medium of claim 18, wherein the first and second paths include threshold detectors, which operate over the same signal range of operation.

* * * * *